United States Patent [19]

Webster

[11] 4,151,598

[45] Apr. 24, 1979

[54] PRIORITY ASSIGNMENT APPARATUS FOR USE IN A MEMORY CONTROLLER

[75] Inventor: Marvin K. Webster, Glendale, Ariz.

[73] Assignee: Honeywell Information Systems Inc., Phoeniz, Ariz.

[21] Appl. No.: 890,119

[22] Filed: Mar. 27, 1978

[51] Int. Cl.² .......................................... G06F 13/00
[52] U.S. Cl. .................................................. 364/900
[58] Field of Search ... 364/200 MS File, 900 MS File

*Primary Examiner*—James D. Thomas
*Attorney, Agent, or Firm*—Vincent B. Ingrassia; William W. Holloway, Jr.; Ronald T. Reiling

[57] ABSTRACT

This relates to an apparatus for assigning priority to information temporarily stored in memory controller stack. Associated with each level of the stack is a counter which measures the length of time the information has been stored. A plurality of comparators and associated control logic determines the stack level which contains information which has been stored the longest. If the destination memory associated with the contents of this level becomes available, this level is given priority with respect to transmission to its destination memory.

8 Claims, 6 Drawing Figures

PRIORITY ASSIGNMENT APPARATUS FOR USE IN A MEMORY CONTROLLER

CROSS REFERENCE TO RELATED APPLICATIONS

This is related to application Ser. No. 890,006 entitled "Command Stacking Apparatus For Use In A Memory Controller" filed of even date herewith and assigned to the assignee of the present invention.

BACKGROUND OF THE INVENTION

1. Field of the Invention

This invention relates generally to memory system for use in data processing equipment and, more particularly, to an apparatus for assigning priority to commands, addresses, and data temporarily stored in a memory controller.

2. Prior Art

Modern data processing systems include various subsystems for performing the functions of manipulating, storing and communicating data. Such a system would include, for example, a central processor, a memory, a plurality of input/output (I/O) devices and a control unit. Such data processing systems may differ significantly in configuration; i.e., various functionalities may be located in different subsystems in accordance with various design criteria. Likewise, the required interface circuitry for communication between the various subsystems may differ both in functionality and operation.

Typically, the central processor manipulates the data in accordance with a series of decodeable instructions called a program. These program instructions are generally retrieved sequentially by the processor and, along with the data which is to be operated upon, are stored in memory devices.

Such memory devices may be of several well known types; however, most commonly used for main memory is a random access device having discrete addressable locations each of which provides storage for a word which may comprise data, and/or commands and may contain specific fields useful in a variety of operations. Generally, when the processor is in need of data or instructions, it will generate a memory cycle and provide an address to the memory in order to retrieve the data or word stored in that address.

The series of instructions comprising the program is usually loaded into memory at the beginning of each operation and occupies a block of memory which noramlly must not be disturbed or altered until a program has been completed. Data to be operated upon by the processor in accordance with the stored instructions is stored in other areas of memory and is retrieved and replaced in accordance with the program instructions.

Communication between the outside world and the data processing system is usually accomplished through the use of a plurality of I/O devices, including such apparatus as magnetic tape handlers, paper tape readers, punch card readers, and remote terminal devices. To control the transfer of information between the I/O devices, an I/O control means is provided which couples the various I/O devices to the processor. The I/O controller coordinates the information flow to and from the various I/O devices and also awards priority when more than one I/O device is attempting to communicate with the rest of the system. Since the I/O devices are usually electromechanical in nature and, as such, are characterized by much slower operating speeds than the remainder of the data processing system, the I/O controller provides buffering to enable the remainder of the processing system to proceed at its normal rate. In many applications, it is advantageous to utilize more than one processor and more than one memory. Likewise, such systems generally require a large number of I/O devices, thus requiring several I/O controllers.

A memory controller is provided to coordinate communications among the processor, memory devices and I/O controllers. It receives requests for access to memory as well as specific requests for communications to other subsystems. The memory controller coordinates the execution of operations and transfers of information and may also provide a means for establishing priority when requests for access to memory are generated by more than one subsystem.

A typical data processing system may contain a single memory controller; however, multiple computer configurations may utilize several memory controllers. In those environments more than one memory controller is employed, each is independent from the other and functions simultaneously, thus providing parallellism in accessing of the memory system. Each memory controller will temporarily store requests from the processors and I/O controllers and generally service these subsystems in accordance with a priority scheme. Data transfers between the various communicating devices and the memory controllers are word oriented, e.g., 40 bits. Typical data processing systems employing memory controllers are shown and described in U.S. Pat. No. 3,413,613, entitled "Reconfigurable Data Processing System".

The instructions, commands, and addresses which are forwarded to the memory controller are accepted and temporarily stored in a stack comprised of a plurality of registers until the appropriate destination units are available to receive the information. Typically, the information so stored was forwarded to the destination units on a First In/First Out basis. A write counter determines which register in the stack received the incoming information, a read counter selects the register whose contents are to be passed on to its destination unit next. The presence of a command in the stack is usually detected by comparing the contents of the write counter with the contents of the read counter. If they are unequal, this indicates that the stack contains information to be passed on. The write counter is advanced when a request is received by the memory controller, and the read counter is advanced when the information is passed from the stack to the appropriate destination unit. If the destination unit corresponding to the next command to be read out of the stack is busy, other commands which occupy a lower position in the stack cannot be forwarded even if their particular destination units are free. Thus, one busy destination unit can effectively block information destined for free units. This is clearly inefficient and accounts for undue delays in a technology where speed is of the utmost importance.

Further, since the stack is a finite length, the danger exists that the write counter will exhaust all available locations in the stack and will wrap around upon itself thus writing new information into a stack location before the contents of that location have been forwarded to its destination unit. If this occurs, the contents of the register or registers in question is lost resulting in a system error.

In order to partially solve these problems, the above referenced copending application describes an apparatus for storing information in the stack. Instructions, commands and addresses are accepted and temporarily stored in the lowest level of the stack not occupied. Associated with each stack level is a busy flip-flop which is set when information is stored in the corresponding stack level. The busy flip-flop is reset when the information is passed on to the destination memory.

SUMMARY OF THE INVENTION

It is an object of the present invention to provide an arrangement for assigning priority to information stored in a memory controller such that information destined for a free memory is not blocked by information destined for a busy or unavailable memory.

It is a further object of the present invention that the contents of a first stack level whose destination memory is free be given priority over other stack levels whose destination memories are likewise free if the contents of the first stack level have been stored in the stack for a longer period of time than that of the other stack levels.

According to a broad aspect of the invention there is provided an apparatus for assigning priority to information temporarily stored in a plurality of storage registers each of which forms a level in a multi-level storage stack, said information destined for at least one destination unit, which unit generates a ready signal indicating its availability, comprising: measuring means for assigning priority to a first level containing information which has been stored longer than that in any other level; and control means coupled to said measuring means and to said multi-level stack for forwarding the contents of said first level to said at least one destination unit.

The above and other objects of the present invention will be more clearly understood from the following detailed description taken in conjunction with the accompanying drawings, in which:

DESCRIPTION OF THE PREFERRED EMBODIMENT

Figure 1:
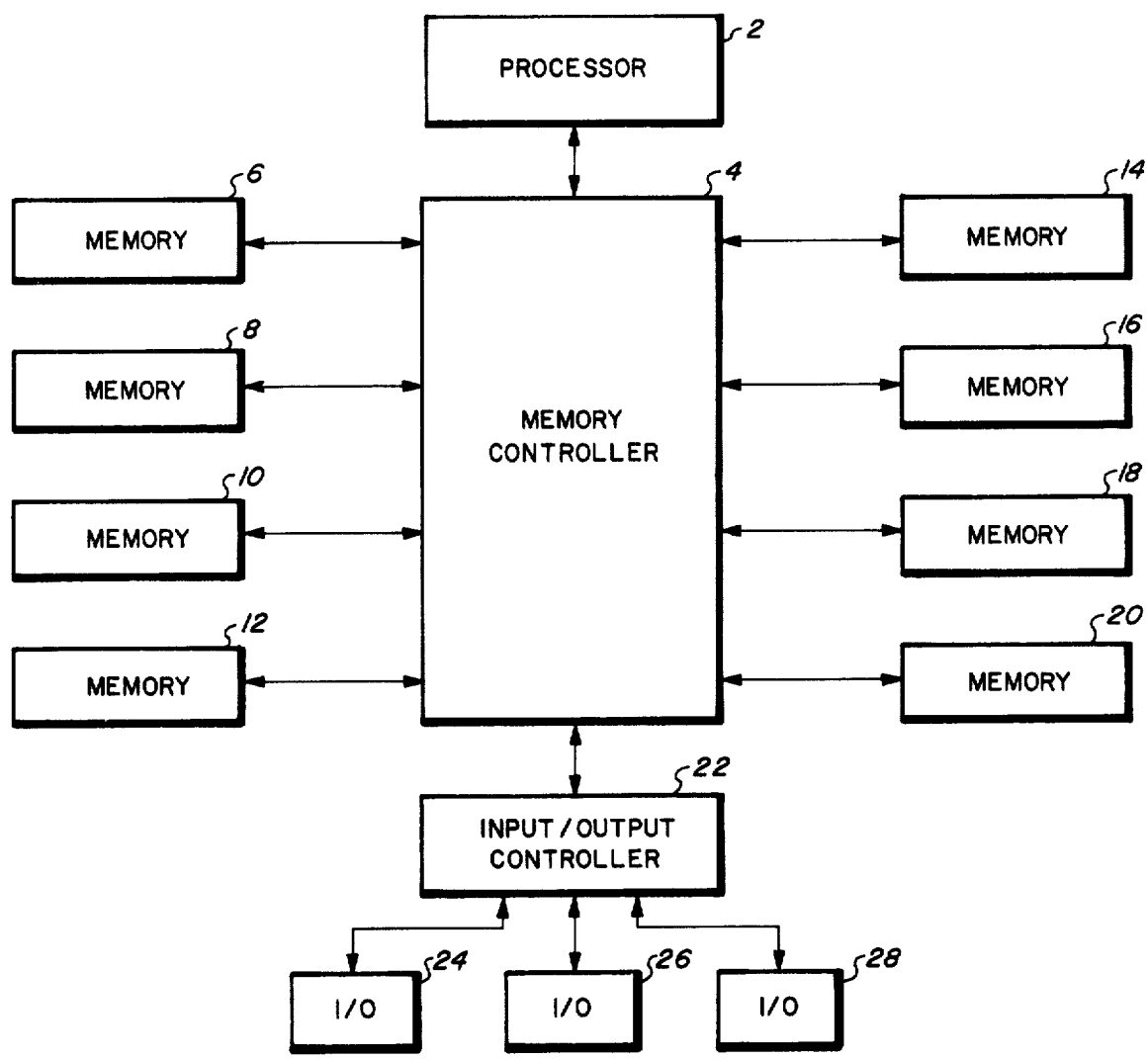
FIG. 1 is a block diagram of a data processing system employing a memory controller and several memory banks according to the prior art.

FIG. 1 is a block diagram of a data processing system employing a single memory controller 4 and several memory banks 6, 8, 10, 12, 14, 16, 18 and 20. The data processing system also includes a processor 2, an I/O controller 22 and a plurality of I/O devices 24, 26, and 28. Memory controller 4 interconnects processor 2, I/O controller 22 and each of the several memories, and coordinates communications there between. While eight memory banks are shown in FIG. 1 as communicating with memory controller 4, it should be clear that this is only an example of a typical data processing configuration and that if required, a different number of memory banks could be employed, as well as additional memroy controllers. A stacking apparatus is provided in the memory controller to accept and temporarily store commands, address and data information destined for memory devices 6, 8, 10, 12, 14, 16, 18 and 20 when any one or more of the memory banks are busy or otherwise unavailable.

Figure 2:
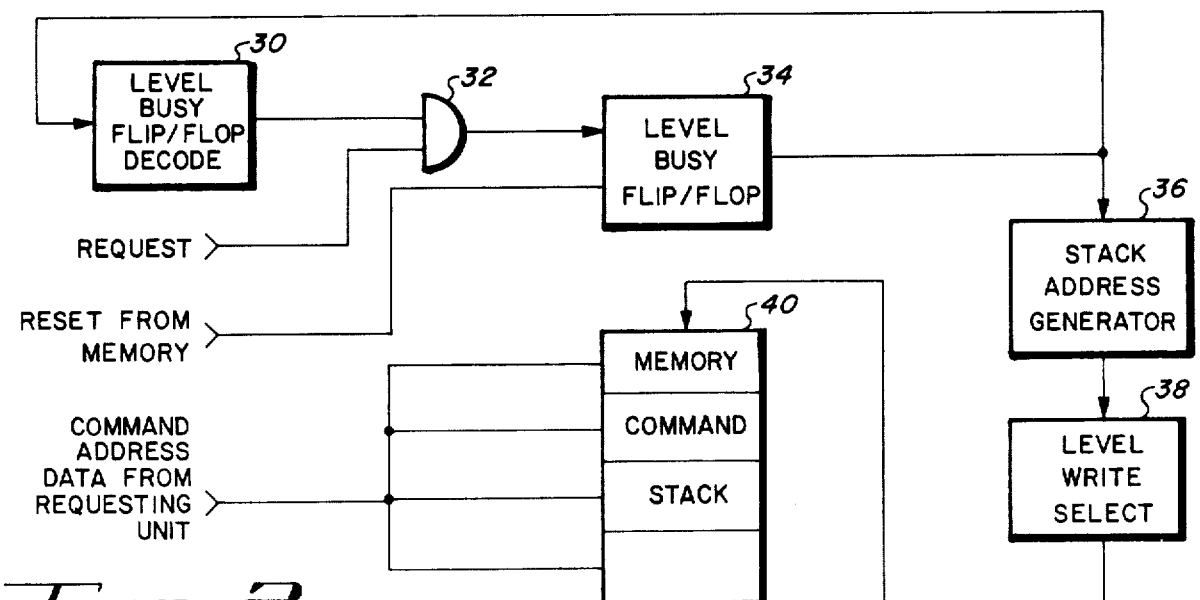
FIG. 2 is a block diagram of a stacking apparatus for use in a memory controller.

FIG. 2 is a functional block diagram of a stacking apparatus which is the subject of the above referenced copending application. While it forms no part of the present invention, a brief explanation of its operation is believed necessary to impart a clear understanding of the present invention. Referring to FIG. 2, there is shown a memory stack 40 comprised of 4 stack levels, i.e., levels 0, 1, 2, and 3. Command, address, and data information from various possible requesting units in the data processing system is shown as being applied to each level of the stack. Associated with each level is a level busy flip-flop shown functionally as block 34. Whenever information is written into a particular stack level, the level busy flip-flop associated with that level is set. When information in a particular level is read out or passed on to its destination unit, the corresponding level busy flip-flop is reset. The apparatus is designed to store incoming command, address, and data information in the lowest level of the stack which is unoccupied and operates as follows. Level busy flip-flop decode 30 has applied to its inputs the outputs of the level busy flip-flops and determines therefrom the lowest level in stack 40 which is unoccupied. The level busy flip-flop outputs are also applied to a stack address generator 36 which generates and applies a level address to level write select 38. It will be seen that the stack comprises four levels and as such a two-bit address is sufficient to designate any particular level in the stack, i.e., 00, 01, 10, and 11. While the stack is shown as having only four levels, it should be apparent that the stack may be of any length with appropriate modifications to the stack address generator such that a unique address can be generated for each level. Since data processing systems are generally word oriented, each level of the stack is capable of storing several words which may comprise instruction bits, data bits, and address bits. A simple flip-flop register of a predetermined length would be sufficient.

The stacking apparatus shown in FIG. 2 operates as follows. A request is received from a requesting unit (for example, the processor) and is applied to AND function 32. The second input of AND function 32 is coupled to the output of level busy flip-flop decode 30, which input designates the lowest unoccupied level in the stack. At the same time, stack address generator 36 generates an address indicative of the lowest unoccupied level and applies this address to the level write select unit 38. The output of AND function 32 then sets the level busy flip-flop corresponding to the lowest unoccupied level. Simultaneously, the level write select 38 enables the command, address, or data information from the requesting unit to be accepted and stored in the lowest unoccupied level. The level busy flip-flops associated with the particular stack levels are reset by the memory when the information contained within the particular stack levels is passed on and accepted by the memory. A more detailed discussion of the stacking apparatus shown in FIG. 2 may be found in the above cited copending U.S. application.

Figure 3:
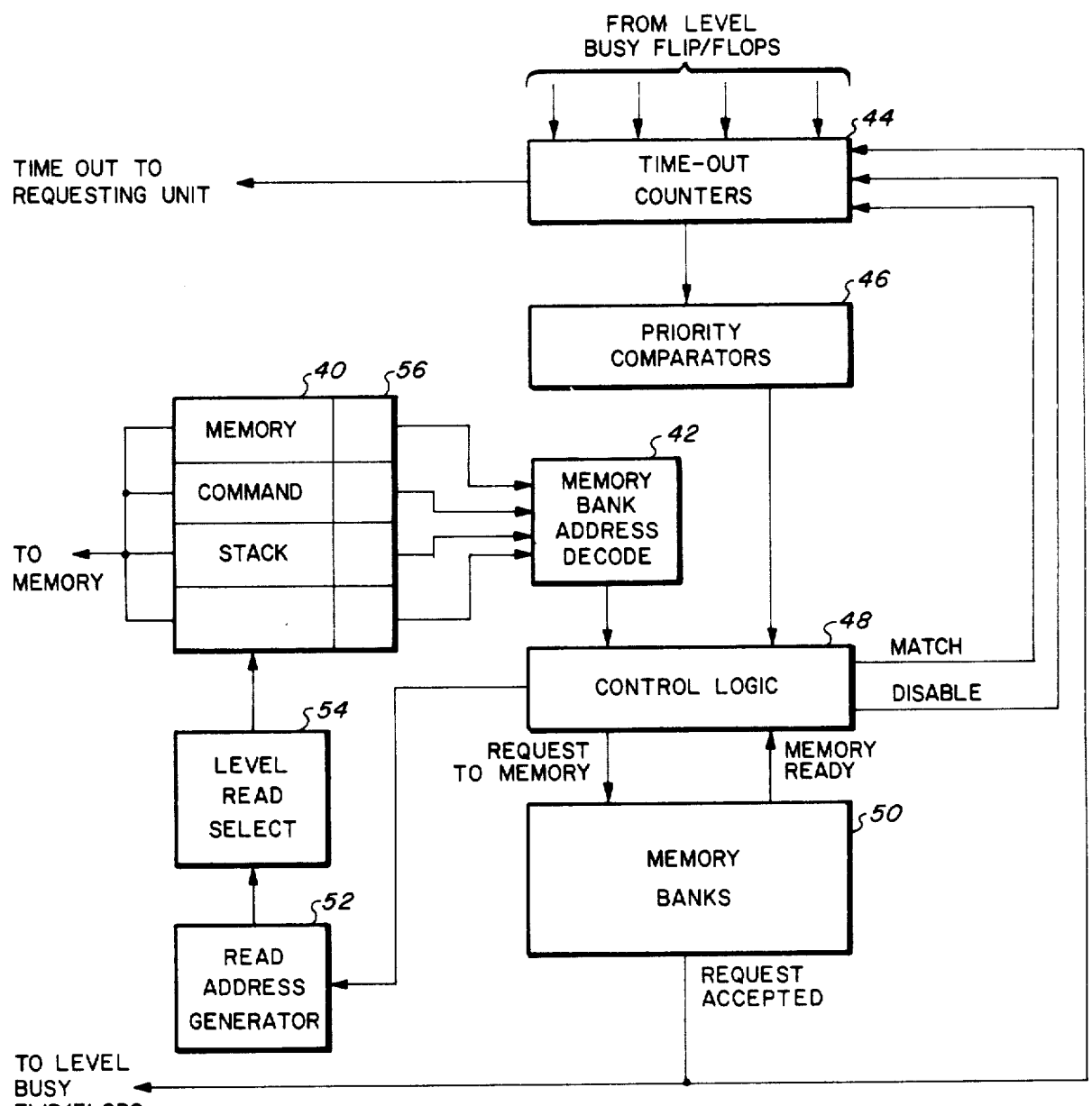
FIG. 3 is a block diagram of a priority assignment apparatus according to the present invention.

Referring to FIG. 3, there is shown a functional block diagram of a priority assignment apparatus in accordance with the present invention. As stated previously, the contents of each word stored in the memory stack may contain instruction, data and address information.

In a multiple memory system it is necessary that each word contain address bits indicative of its destination memory. For example, a three bit address in each word would be sufficient to provide a unique address for each of the eight memory banks shown in FIG. 1. The address field in stack 40 is shown as field 56 in FIG. 3.

These address bits are applied to memory bank address decode 42 which determines the particular memory bank to which the information in any particular stack level is destined. As will be shown hereinbelow, a memory bank address decode is necessary for each level of the stack.

Once it is determined to what memory banks the contents of the stack locations are destined, it is then necessary to determine if the particular memory banks in question are available or ready to accept the information. This is accomplished in control logic 48 which receives memory-ready signals from the various memory banks 50. Control logic 48 detects the coincidences of information destined for a particular memory bank and the availability of the particular memory bank. The situation must now be addressed as to what action should be taken when information within the stack or the several locations thereof are destined for different memory banks and two or more of those memory banks are available to receive the data. This is accomplished by means of time out counters 44 and priority comparators 46.

As stated previously, when information is loaded into a particular level of stack 40, a level busy flip-flop associated with that level is set. The output of each level-busy flip-flop is coupled so as to enable a binary counter associated with that level to count. While this is shown functionally as block 44, it should be appreciated that a different counter is associated with each level of the stack, as will be more fully described below. The contents of each of the counters are compared in a plurality of comparators, shown functionally as 46 to determine which counter contains the greater count; i.e., what information in the stack has been waiting the longest for forwarding to its destination unit. An indication of priority is forwarded to the control logic 48.

Without additional control, it would be possible for one level in the stack destined for a particular memory to block other information destined for free memories. That is, assume levels 0, 1, and 2 were destined for free memories and level 3 were destined for a busy memory. It is possible that the time out counter associated with level 3 would contain the highest count, thus having priority over all other levels even though the memory to which it is destined is busy. This is prevented in that each of the time out counters is prevented from presenting its count outputs to the priority comparators unless a match condition has been detected in the control logic. That is, it must first be determined that a level in the stack contains information for a free memory before the contents of the time out counter associated with that level is applied to the priority comparators. This match function is shown functionally as originating in control logic unit 48 and is applied to time out counters 44. Thus, information will be passed from a particular stack level to its destination memory if: (1) that destination memory is ready and available to accept the information, and (2) the information contained in that level has been stored for a greater period of time than information in other levels of the stack destined for free memories.

Once priority has been established, a read address generator 52 coupled to logic control unit 48 generates a two-bit address (2 bits are sufficient if not more than 4 stack levels are employed). The address generated by read address generator 52 is applied to level read select 54 which gates the information in the appropriate stack level to the appropriate destination memory. Control logic 48 also generates a request to memory in order to inform the destination memory that information is being forwarded from the stack.

Once a priority has been established, control logic 48 generates a disable signal which is applied to the appropriate time out counter to prevent continued counting. Further, when the information has been accepted by the appropriate destination memory, the memory generates a request accepted signal which is used in the memory controller to reset the appropriate level busy flip-flop and its associated time out counter.

One additional function of the time out counter should be pointed out. It is desireable that the requesting unit be informed if its request has not been processed within a predetermined amount of time. This may be accomplished by providing decoding means for decoding a selected state of the counter and generating a signal which if forwarded back to the requesting unit. This signal is shown in FIG. 3 as a time out signal to the requesting unit generated by time out counter 44. If a requesting unit is so informed, certain options are available to it. First, the requesting unit may simply try again. Second, if after a subsequent attempt, access to the destination memory cannot be accomplished, a memory scan cycle could be initiated and certain portions of memory deallocated.

Figure 4:
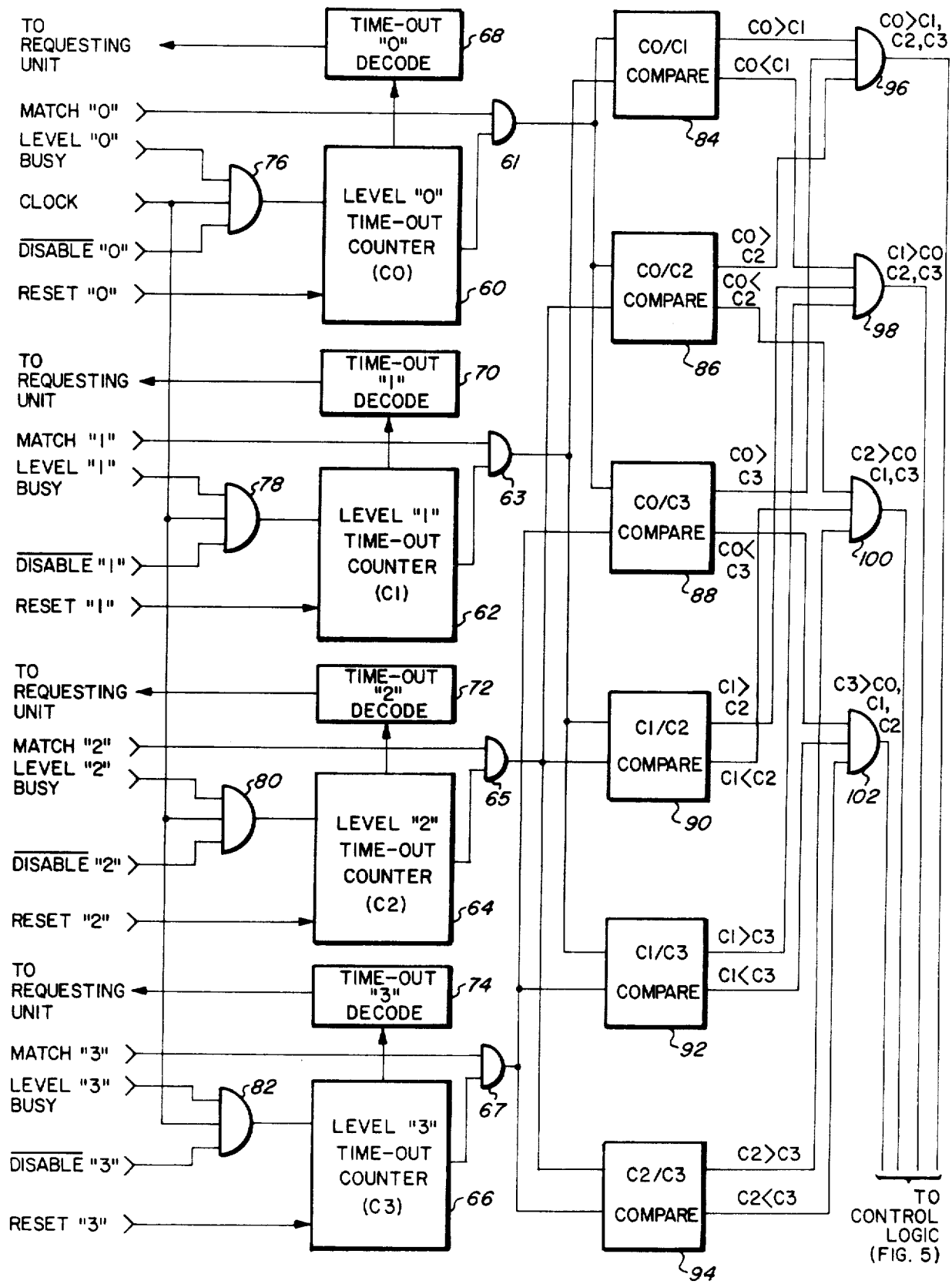
FIG. 4 is a more detailed diagram of the time out counters and priority comparators shown in FIG. 3.

FIG. 4 is a more detailed diagram of the time out counters and priority logic shown functionally in FIG. 3. Referring to FIG. 4, four time out counters 60, 62, 64, and 66 are provided. Since they each operate in the same manner, only time out counter 60 will be discussed. Time out counter 60 is enabled by AND function 76 which has three inputs. The first input is a clock signal which is likewise coupled to AND functions 78, 80, and 82. The second input to AND functions 76 (level "0" busy) is generated by the level "0" busy flip-flop, previously discussed, as a result of it being set and information stored into level "0" of the stack. Finally, as previously described, the time out counter associated with level "0" is disabled when a request to memory has been made and the information stored in level "0" is being forwarded to its destination memory. The third input to AND function 76 (disable "0") indicates that this has not taken place. Similar AND functions 78, 80 and 82 control the enabling of time out counters 62, 64 and 66 respectively. Associated with each time out counter is time out decode unit which decodes a predetermined state of its associated time out counter. The predetermined state corresponds to an interval of time after which the requesting unit should be notified that its request has not been processed.

Coupled to the outputs of the time out counters 60, 62, 64 and 66 are a plurality of comparators 84, 86, 88, 90, 92 and 94. Each comparator has its inputs coupled to two time out counters via AND functions 61, 63, 65 and 67 for determining the relative magnitude of the counts contained therein. (The additional input to AND functions 61, 63, 65 and 67 is energized when a match condition has been detected.) The inputs of comparator 84 are coupled to the outputs of time out counters 60 and 62. Comparator 84 generates two outputs, the first indicating that the contents of counter 60 is greater than the contents of counter 62 and the second indicating that the contents of counter 60 is less than that of 62. Likewise, comparator 86 compares to the contents of counters 60 and 64, comparator 88 compares the contents of counters 60 and 66, comparator 90 compares the contents of counters 62 and 64, comparator 92 compares the contents of counters 62 and 66, and comparator 94 compares the contents of counters 64 and 66. These outputs are applied to the inputs of AND functions 96, 98, 100, and 102 as shown in FIG. 4. For example, AND function 96 has three inputs. The first indicates that the contents of counter 60 is greater than that of counter 62. The second indicates that the contents of counter 60 are greater than that of 64, and the third indicates the contents of counter 60 is greater than that of counter 66. Thus, AND function 96 will yield an output when the contents of counters 60 is greater than any of the remaining counters 62, 64, or 66. In a similar manner, an output from AND function 98 indicates that counter 62 contains the greatest count, an output from AND function 100 indicates that the counter 64 is the greatest count and an output from AND function 102 indicates that counter 66 contains the highest count. There has thus been established a stack priority assignment based on how long information has been stored in a particular level of the stack.

Figure 5:
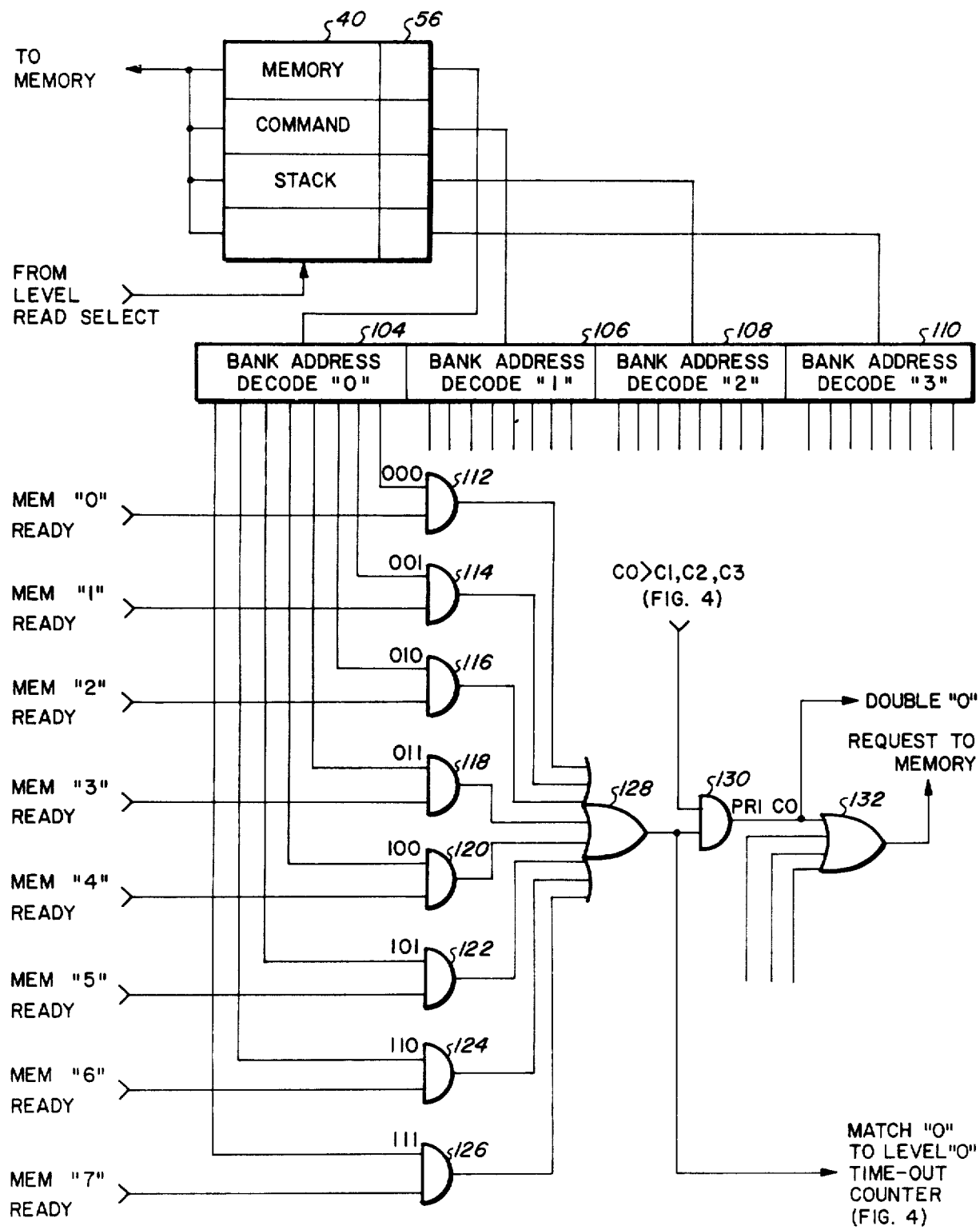
FIG. 5 is a more detailed diagram of the memory bank address decode and control logic of FIG. 3.

FIG. 5 is a more detailed diagram of the memory bank address decode 42 and control logic 48 shown in FIG. 3. Referring to FIG. 5, there is shown in memory stack 40 each level of which has an address portion 56. As stated previously, if the data processing system employs eight memory banks, a three bit address porition 56 would be sufficient to uniquely identify each unit memory bank. As shown, each level of the stack is coupled to a bank address decode, i.e., level "0" is coupled to bank address decode "0" 104. Similar bank address decodes 106, 108, and 110 are provided for coupling to the additional stack levels. For the sake of simplicity and explanation, only the address outputs of bank address decode "0" 104 are shown coupled to the control logic.

The control logic consists of a plurality of AND functions 112, 114, 116, 118, 120, 122, 124, 126, and 130 and OR function 128. As shown, each of the address decodes from a bank address decode "0" 104 is applied to one of the AND functions 112-126. The second input to AND functions 112-126 comprises a memory ready signal which originates in the memory and indicates that that particular memory is ready and available, to receive information from the stack. For example, if memory "0" is available, a memory "0" ready signal is applied to an input of AND function 112. Similarly, a memory "1" ready signal is applied to the input AND function 114 if memory bank one is available. The remaining AND functions 116 and 126 operate similarly. The outputs of AND functions 112-126 are each applied to an input of OR function 128, the output of which is in turn coupled to AND function 130. The output of OR function 128 is likewise coupled to the match input of the level "0" time out counter as previously described so as to permit that time out counter to count.

The second input to AND function 130 is the output of AND function 96 shown in FIG. 4 indicating that the information stored in level "0" of the stack has priority in accordance with the technique described above. It should be clear that the logic represented by AND functions 112-126, 130 and OR function 128 is duplicated for each level of the stack and bank address decode 106, 108, and 110.

An output from AND function 130 represents that the memory to which the contents of level "0" in the stack is destined is ready and that those contents have been assigned a priority. Similar outputs from control logic associated with the remaining levels form the additional three inputs to OR function 132.

As shown in FIG. 5, the output of AND gate 130 is also applied to the enabling input of the level "0" time out counter to disable it until the counter can be reset by memory when it has accepted the data.

Figure 6:
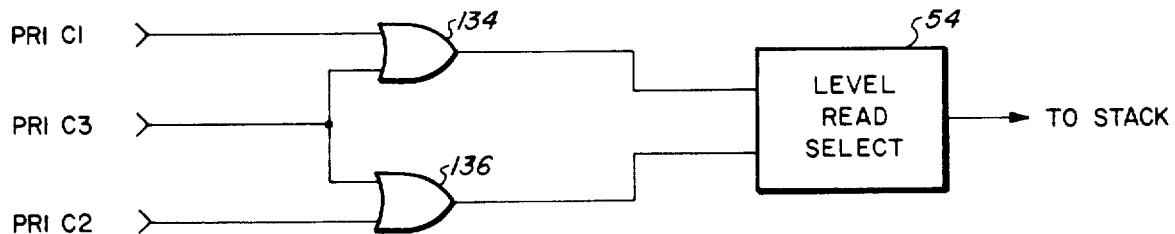
FIG. 6 is a more detailed diagram of the read address generator and level read select units shown in FIG. 3.

The priority signals generated by the counter parts to AND function 130 and associated with levels 1, 2, and 3 in the stack (bank address decodes 106, 108, and 110) are coupled to OR functions 134 and 136 as shown in FIG. 6. The outputs of OR functions 134 and 136 are applied to the level read select unit 54 which is shown in FIG. 3 as being coupled to the stack 40 for enabling an appropriate level to be passed on to its destination memory. For example, if level "0" has priority, then PRI C1=PRI C2=PRI C3=0 thus, the input address to level read select is 00. If, however level "1" has priority, then PRI C1=1 and PRI C2=PRI C3=0, thus yielding an address 01. A level "2" priority yields the address 10, and finally a level 3 priority yields an address 11. Thus, the appropriate level is read from the memory stack and forwarded to its appropriate destination memory.

The above described priority assignment apparatus assures that information destined for a free memory is not blocked by information destined for busy or unavailable memories. Further, priority is based on the length of time information has been stored in the stack.

While the invention has been particularly shown and described with reference to a preferred embodiment thereof, it should be understood that changes in form and details may be made therein without departing from the spirit and scope of the invention.

What is claimed is:

1. An apparatus for assigning priority to information temporarily stored in a plurality of storage registers each of which forms a level in a multi-level storage stack, said information destined for at least one destination unit, which unit generates a ready signal indicating its availability, comprising:
   measuring means for assigning priority to a first level containing information which has been stored longer than that in any other level; and
   control means coupled to said measuring means and to said multi-level stack for forwarding the contents of said first level to said at least one destination unit.

2. An apparatus according to claim 1, wherein said measuring means comprises:
   a plurality of counters each associated with one level of the stack for counting the length of time information is stored in its associated level; and
   comparing means coupled to said plurality of counters for determining which one of said plurality of counters contain the greatest count.

3. An apparatus according to claim 2, wherein said comparing means comprises:
   a plurality of comparators coupled to said counters; and first logic means coupled to outputs of said comparators for generating a priority signal indicative of which counter contains the greatest count.

4. An apparatus according to claim 3, wherein each of said plurality of comparators compares the contents of two of said plurality of counters.

5. An apparatus according to claim 3, wherein said control means comprises:
first decoding means coupled to each level of said multi-level stack for generating an address identifying the destination unit for which the contents of each level is intended;
second logic means coupled to said first decoding means for determining if the intended destination of each level is available representing a match condition; and
third logic means coupled to said firsts and second logic means for processing said match condition if the level associated with said match condition has priority.

6. An apparatus according to claim 5, wherein said control means further comprises address generating means coupled to the output of said third logic means for enabling the contents of the level having priority to be forwarded to its destination unit.

7. An apparatus according to claim 6 further including disabling means associated with each counter for resetting the counter when the contents of its corresponding level have been forwarded to its destination unit.

8. An apparatus according to claim 7, further including inhibiting means for blocking the outputs of each of said counters until a match condition is detected.

* * * * *